US012685946B1

(12) United States Patent
Taylor

(10) Patent No.: US 12,685,946 B1
(45) Date of Patent: Jul. 21, 2026

(54) TOY FIREHOSE NOZZLE WATER GUN SYSTEMS

(71) Applicant: Michael Taylor, Shreveport, LA (US)

(72) Inventor: Michael Taylor, Shreveport, LA (US)

( * ) Notice: Subject to any disclaimer, the term of this patent is extended or adjusted under 35 U.S.C. 154(b) by 162 days.

(21) Appl. No.: 18/910,806

(22) Filed: Oct. 9, 2024

(51) Int. Cl.
*B05B 9/04* (2006.01)
*A63H 33/30* (2006.01)
*B05B 1/00* (2006.01)
*B05B 15/60* (2018.01)

(52) U.S. Cl.
CPC ............... *A63H 33/30* (2013.01); *B05B 1/00* (2013.01); *B05B 9/04* (2013.01); *B05B 15/60* (2018.02)

(58) Field of Classification Search
CPC .. B05B 1/00; B05B 9/04; B05B 15/60; B05B 9/0426; B05B 1/16–1681; B05B 9/0403; B05B 9/01; B05B 9/08; B05B 7/2475; B05B 7/1427; A63H 33/30–3094; A62C 31/00–05; F41B 9/00–0096
See application file for complete search history.

(56) References Cited

U.S. PATENT DOCUMENTS 4,095,726 A * 6/1978 Hechler, IV ........ A01M 7/0046 224/148.2
4,254,833 A * 3/1981 Perry .................... A62C 15/00 169/88
4,688,643 A * 8/1987 Carter .................... A62C 15/00 169/33
6,866,512 B2 3/2005 Ebersole, Jr. et al.
10,610,715 B1 * 4/2020 Taylor .................... A62C 31/22
2005/0274825 A1 12/2005 Seguin

* cited by examiner

*Primary Examiner* — Tuongminh N Pham
(74) *Attorney, Agent, or Firm* — R. Keith Harrison

(57) ABSTRACT

Toy firehose nozzle water gun systems may include a simulated spray nozzle having a simulated barrier-piercing applicator. A spray control assembly may include a selector valve disposable in fluid communication with a selected one of the simulated spray nozzle in a spray nozzle mode and the simulated barrier-piercing applicator in an applicator mode. A water pump may be disposed in fluid communication with the selector valve. A tank harness assembly having a water tank may be configured to be worn by the user. The water tank may be configured to contain a supply of liquid and may be disposable in fluid communication with the water pump of the spray control assembly. The water pump may be configured to selectively pump the liquid from the water tank to the selector valve. The selector valve may be configured to distribute the liquid to the simulated spray nozzle or the simulated barrier-piercing applicator.

20 Claims, 16 Drawing Sheets

TOY FIREHOSE NOZZLE WATER GUN SYSTEMS

FIELD

Illustrative embodiments of the disclosure generally relate to toy water guns. More particularly, illustrative embodiments of the disclosure relate to toy firehose nozzle water gun systems which simulate the appearance and function of firehose nozzles.

SUMMARY

Illustrative embodiments of the disclosure are generally directed to toy firehose nozzle water gun systems configured to simulate the appearance and function of firehose nozzles. An illustrative embodiment of the toy firehose nozzle water gun systems may include a simulated spray nozzle including a spray nozzle housing. The spray nozzle housing may include a base housing section, a terminal housing section, a middle housing section flaring outwardly from the base housing section to the terminal housing section and an applicator inlet portion extending from the base housing section. A housing interior may be formed by the base housing section, the terminal housing section, the middle housing section and the applicator inlet portion. A spray tip may be disposed on the terminal housing section. A simulated barrier-piercing applicator may include an applicator housing supported by the applicator inlet portion of the spray nozzle housing and an applicator tip on the applicator housing. A spray control assembly may include a selector valve disposable in fluid communication with a selected one of the spray tip of the simulated spray nozzle in a spray nozzle mode and the applicator tip of the simulated barrier-piercing applicator in an applicator mode. A water pump may be disposed in fluid communication with the selector valve. A tank harness assembly may include a user harness configured to be worn by the user. A water tank may be supported by the user harness. The water tank may be configured to contain a supply of liquid and may be disposable in fluid communication with the water pump of the spray control assembly. The water pump may be configured to selectively pump the liquid from the water tank to the selector valve. The selector valve may be configured to distribute the liquid to the selected one of the spray tip of the simulated spray nozzle and the applicator tip of the simulated barrier-piercing applicator responsive to operation of the water pump.

In another aspect, each of the simulated spray nozzle and the simulated barrier-piercing applicator may include plastic.

In another aspect, the applicator tip may be non-extendable with respect to the applicator housing of the simulated barrier-piercing applicator.

In another aspect, the spray control assembly may include a selector handle operably engaging the selector valve. The selector handle may be operable to selectively deploy the selector valve in the spray nozzle mode and the applicator mode.

In another aspect, the control system may include a trigger button operably interfacing with the water pump and selectively operable to operate the water pump.

In another aspect, a spray tip connector conduit may be disposed in fluid communication with the selector valve and the spray tip of the simulated spray nozzle. An applicator connector conduit may be disposed in fluid communication with the selector valve and the applicator tip of the simulated barrier-piercing applicator.

In another aspect, the spray tip of the simulated spray nozzle may include a spray tip wall extending from the terminal housing section of the spray nozzle housing. The spray tip wall may have a rear spray tip wall end and a front spray tip wall end. A spray tip cavity may be in the front spray tip wall end. The spray tip cavity may be disposed in fluid communication with the selector valve of the spray control assembly.

In another aspect, a valve cavity may be disposed in fluid communication with the spray tip cavity and with the selector valve of the spray control assembly. A spray tip valve may be disposed in the valve cavity.

In another aspect, the user harness of the tank harness assembly may include a harness base, a main harness strap extending from the harness base and a pair of shoulder straps extending from the main harness strap. The shoulder straps may be selectively releasably attachable to the harness base. The water tank may be supported by the main harness strap.

In another aspect, the harness base may include a front harness base segment; a pair of side harness base segments extending outwardly and rearwardly from the front harness base segment; a pair of rear harness base segments extending from the side harness base segments, respectively; and a strap release device selectively and releasably securing the rear harness base segments to each other.

In another aspect, the strap release device may include a strap release tab on a first one of the rear harness base segments and a strap buckle on a second one of the rear harness base segments, the strap buckle configured to releasably engage the strap release tab.

In another aspect, a pair of spaced-apart tank holder rings may be on the main harness strap, and the water tank may be supported by the tank holder rings.

These and other objects, features, and advantages will become more readily apparent from the attached drawings and the detailed description of the preferred embodiments, which follow.

BRIEF DESCRIPTION OF THE DRAWINGS

Illustrative embodiments of the disclosure will now be described, by way of example, with reference to the accompanying drawings, in which.

Like reference numerals refer to like parts throughout the several views of the drawings.

DETAILED DESCRIPTION

Figure 1:
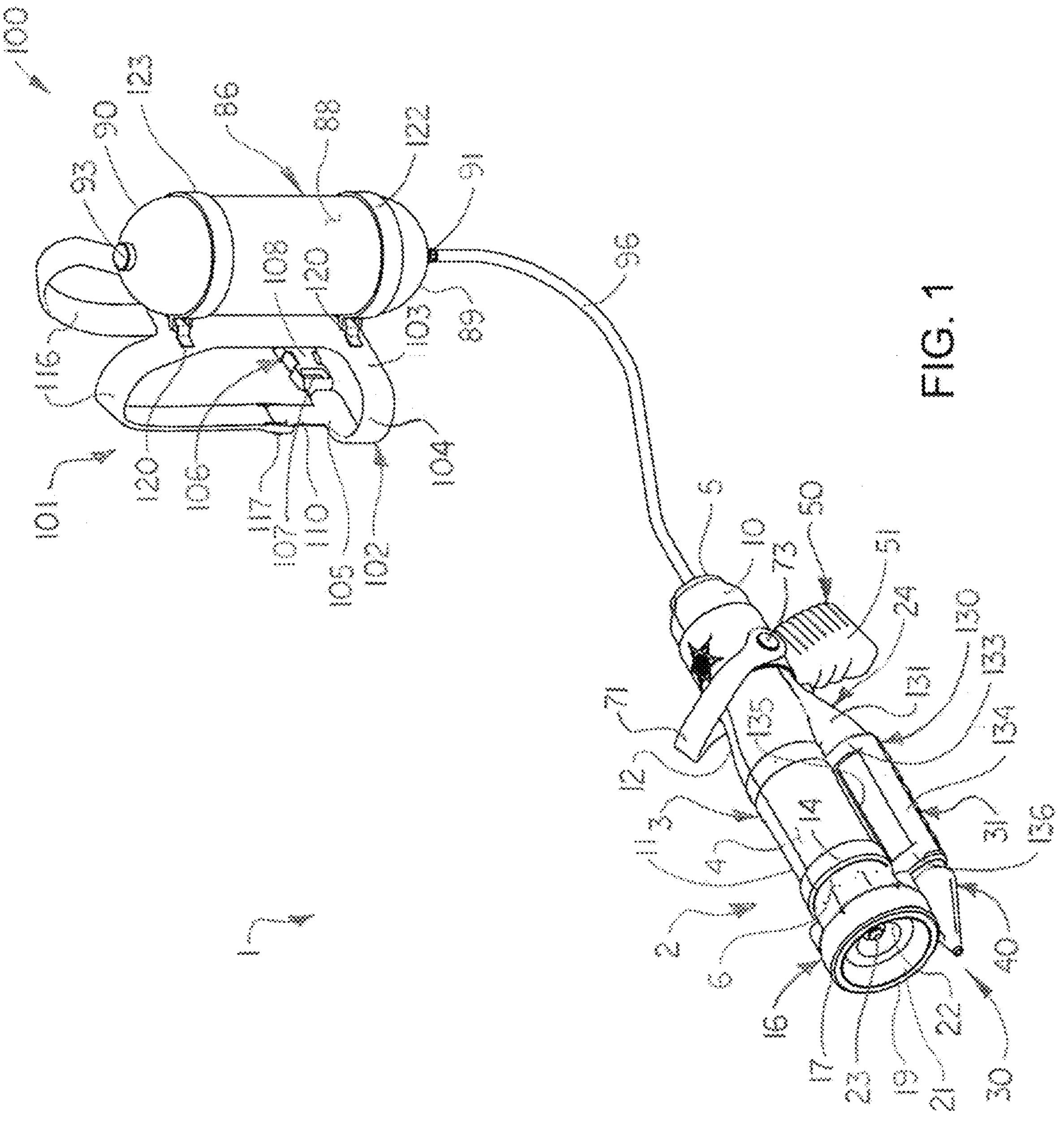
FIG. 1 is a front perspective view of an illustrative embodiment of the toy firehose nozzle water gun systems.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment. Throughout the written description, drawings and claims appended hereto, unless otherwise noted, it shall be recognized and understood that each embodiment of the described, illustrated and claimed subject matter may comprise, consist essentially of, or consist of any component, element or combination of components or elements set forth herein.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

The term "or combinations thereof as used herein refers to all permutations and combinations of the listed items preceding the term. For example, "A, B, C, or combinations thereof is intended to include at least one of A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Referring to the drawings, an illustrative embodiment of the toy firehose nozzle water gun systems, hereinafter system, is generally indicated by reference number 1 in FIGS. 1 and 2. As will be hereinafter described, the system 1 may be configured for operation by a user (not illustrated) as a simulated toy firehose nozzle. The system 1 may include a hand-holdable simulated spray nozzle 2. The simulated spray nozzle 2 may have a spray tip 16 and a simulated barrier-piercing applicator 30 having an applicator tip 40. A tank harness assembly 100 may include a user harness 101. The user harness 101 may be wearable by the user of the system 1. At least one water tank 86 may be supported by the user harness 101. The water tank 86 may be configured to contain a supply of water or other liquid. A flexible tank hose 96 may connect the simulated spray nozzle 2 in fluid communication with the water tank 86. Accordingly, by operation of the simulated spray nozzle 2, the liquid may be pumped from the water tank 86 of the tank harness assembly 100 through the tank hose 96 to the simulated spray nozzle 2 and discharged or ejected from a selected one of the spray tip 16 and the applicator tip 40 in a water fighting exercise or a simulated firefighting exercise, for example and without limitation.

As used herein, "simulated", "simulate" and like terms, as applied to the spray nozzle 2 and the barrier-piercing applicator 30, denote structures or devices which may or may not comply with NFPA 25 standards for inspection, testing, and maintenance. NFPA 25 is the baseline for inspection, testing, and maintenance of water-based fire protection systems as established by the National Fire Protection Association (NFPA). Accordingly, the simulated spray nozzle 2 and the simulated barrier-piercing applicator 30 are suitable for water fighting exercises or simulated role-playing firefighting exercises for amusement purposes, for example and without limitation.

Figure 10:
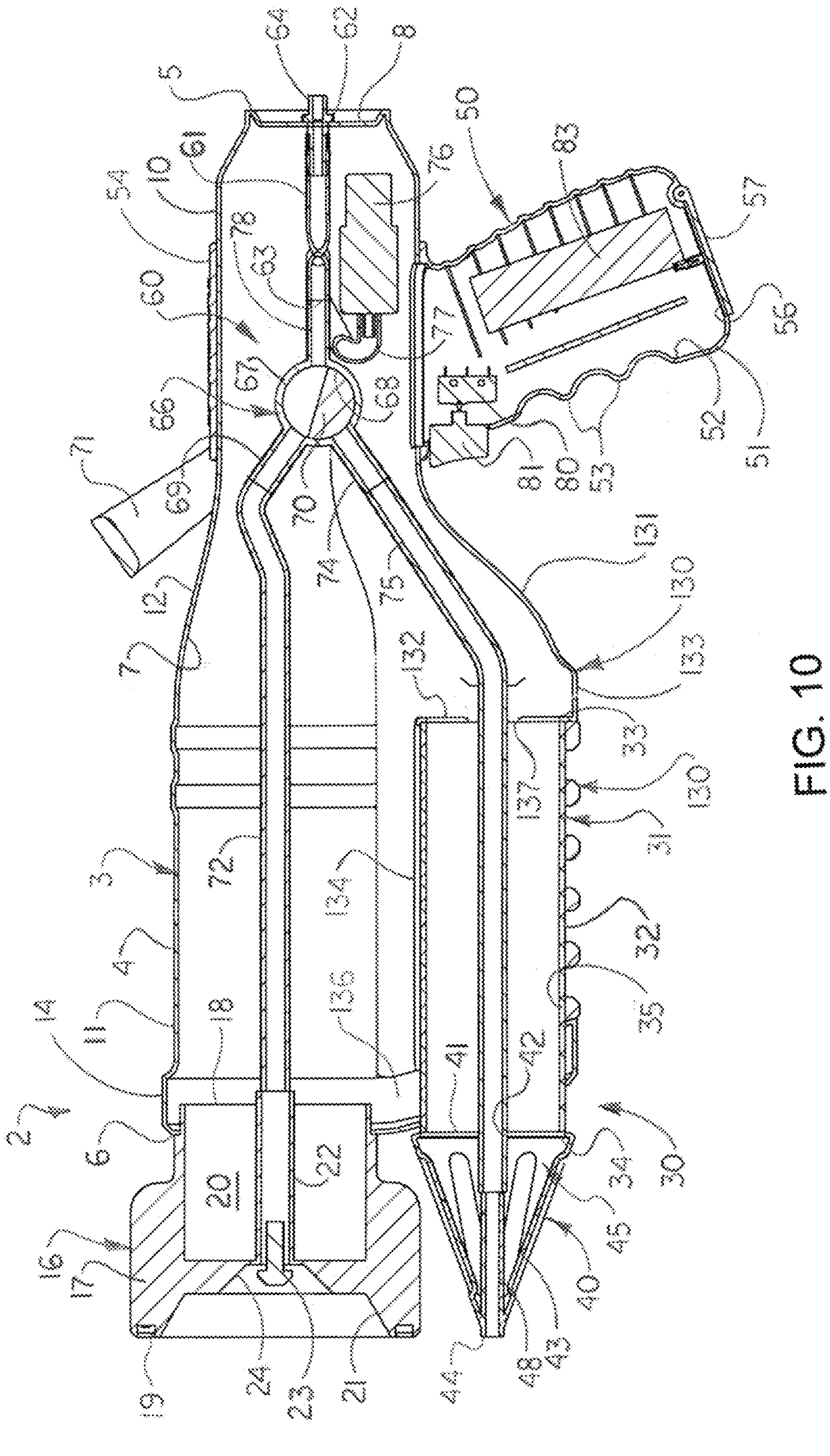
FIG. 10 is a longitudinal sectional view of the spray nozzle, taken along section lines 10-10 in FIG. 7, with the spray control assembly deployed in the spray nozzle mode of operation.
Figure 11:
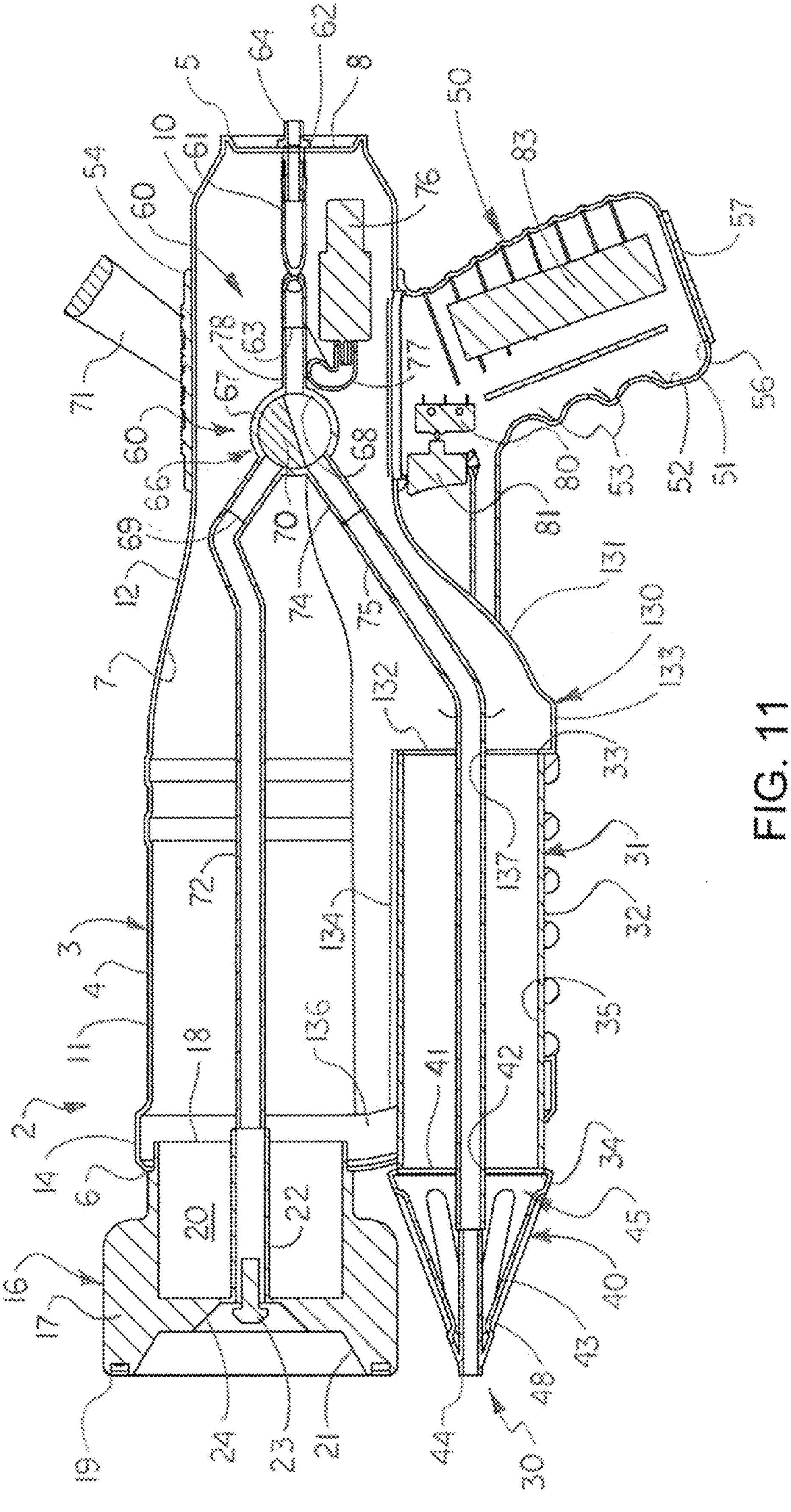
FIG. 11 is a longitudinal sectional view of the spray nozzle, with the spray control assembly deployed in the barrier-piercing applicator mode of operation.

The simulated spray nozzle 2 of the system 1 may include a spray nozzle housing 3. The spray nozzle housing 3 may have a spray nozzle housing wall 4 with a rear nozzle housing end 5 and a front nozzle housing end 6. The spray nozzle housing wall 4 of the spray nozzle housing 3 may form a base housing section 10 having the rear nozzle housing end 5 and a terminal housing section 11 having the front nozzle housing end 6. A middle housing section 12 may flare outwardly from the base housing section 10 to the terminal housing section 11. An applicator inlet portion 131 may extend from the base housing section 10. The applicator inlet portion 131 may branch from the base housing section 10 beneath the middle housing section 12. As illustrated in FIGS. 10 and 11, a housing interior 7 may be formed by the base housing section 10, the terminal housing section 11, the middle housing section 12 and the applicator inlet portion 131 of the spray nozzle housing 3. A rear housing wall 8 may close the housing interior 7 at the rear nozzle housing end 5. In some embodiments, an outward circumferentially extending wall flare 14 may be formed in the spray housing wall 4 at the front nozzle housing end 6.

The spray tip 16 may be disposed on the terminal housing section 11 of the spray nozzle housing 3. As further illustrated in FIGS. 10 and 11, in some embodiments, the spray tip 16 may include a spray tip wall 17. The spray tip wall 17 may have a rear spray tip end 18 at the front nozzle housing end 6 of the spray nozzle housing wall 4 and a front spray tip end 19 opposite the rear spray tip end 18. The spray tip wall 17 may form a spray tip interior 20. The spray tip interior 20 may open to the rear spray tip end 18 of the spray tip wall 17. A spray tip cavity 21, which may have a beveled cross-section, as illustrated, may extend into the front spray tip end 19. A valve cavity 24 may extend rearwardly through the spray tip wall 17 from and in communication with the spray tip cavity 21 to and in communication with the spray tip interior 20. The valve cavity 24 may be beveled in cross-section and concentric with the spray tip cavity 21.

A spray tip conduit 22 may span the spray tip interior 20 from the valve cavity 24 to the rear spray tip end 18 of the spray tip 16. A spray tip valve 23 may be disposed in the front end portion of the spray tip conduit 22 and may protrude from the spray tip conduit 22 into the valve cavity 24. The spray tip valve 23 may be slidably deployable between a sealing valve position and an unsealing valve position in the spray tip conduit 22 and spring-biased in the sealing valve position. In the sealing valve position, the spray tip valve 23 may engage or seat against the spray tip conduit 22 to seal the valve cavity 24 from the spray tip conduit 22. In the unsealing valve position, the spray tip valve 23 may disengage or unseat from the spray tip conduit 22 to unseal the valve cavity 24 and establish fluid communication between the valve cavity 24 and the spray tip conduit 22. The spray tip valve 23 may be spring biased in the sealing valve position typically according to the knowledge of those skilled in the art.

The simulated barrier-piercing applicator 30 may be disposed on the spray nozzle housing 3 of the spray nozzle 2. The simulated barrier-piercing applicator 30 may include an applicator housing 31 which may be supported by the applicator inlet portion 131 of the spray nozzle housing 3, typically as will be hereinafter described. An applicator tip 40 may be disposed on the applicator housing 31. As illustrated in FIGS. 10 and 11, the applicator housing 31 of the simulated barrier-piercing applicator 30 may include an applicator housing wall 32. In some embodiments, the applicator housing wall 32 of the applicator housing 31 may be elongated and cylindrical with a rear applicator housing end 33 and a front applicator housing end 34. In some embodiments, the applicator housing wall 32 of the applicator housing 31 may be unitary, non-segmented and formed of one piece from the rear applicator housing end 33 to the front applicator housing end 34. An applicator housing interior 35 may be formed by the applicator housing wall 32. The applicator housing interior 35 may extend from the rear applicator housing end 33 to the front applicator housing end 34.

As further illustrated in FIGS. 10 and 11, the applicator tip 40 of the simulated barrier-piercing applicator 30 may include a rear applicator tip wall 41 at the front applicator housing end 34 of the applicator housing 31. A rear applicator tip wall opening 42, the purpose of which will be hereinafter described, may extend through the rear applicator tip wall 41. A side applicator tip wall 43 may extend forwardly from the rear applicator tip wall 41. The side applicator tip wall 43 may taper inwardly from the rear applicator tip wall 41 to an open applicator tip terminal end 44. In some embodiments, the side applicator tip wall 43 of the applicator housing 31 may be unitary, non-segmented and formed of one piece from the rear applicator tip wall 41 to the applicator tip terminal end 44. An applicator tip interior 45 may be formed by the rear applicator tip wall 41 and the side applicator tip wall 43. An applicator tip conduit 48 may traverse at least a portion of the applicator tip interior 45. The applicator tip conduit 48 may be disposed in fluid communication with the open applicator tip terminal end 44 of the side applicator tip wall 43.

Figure 3:
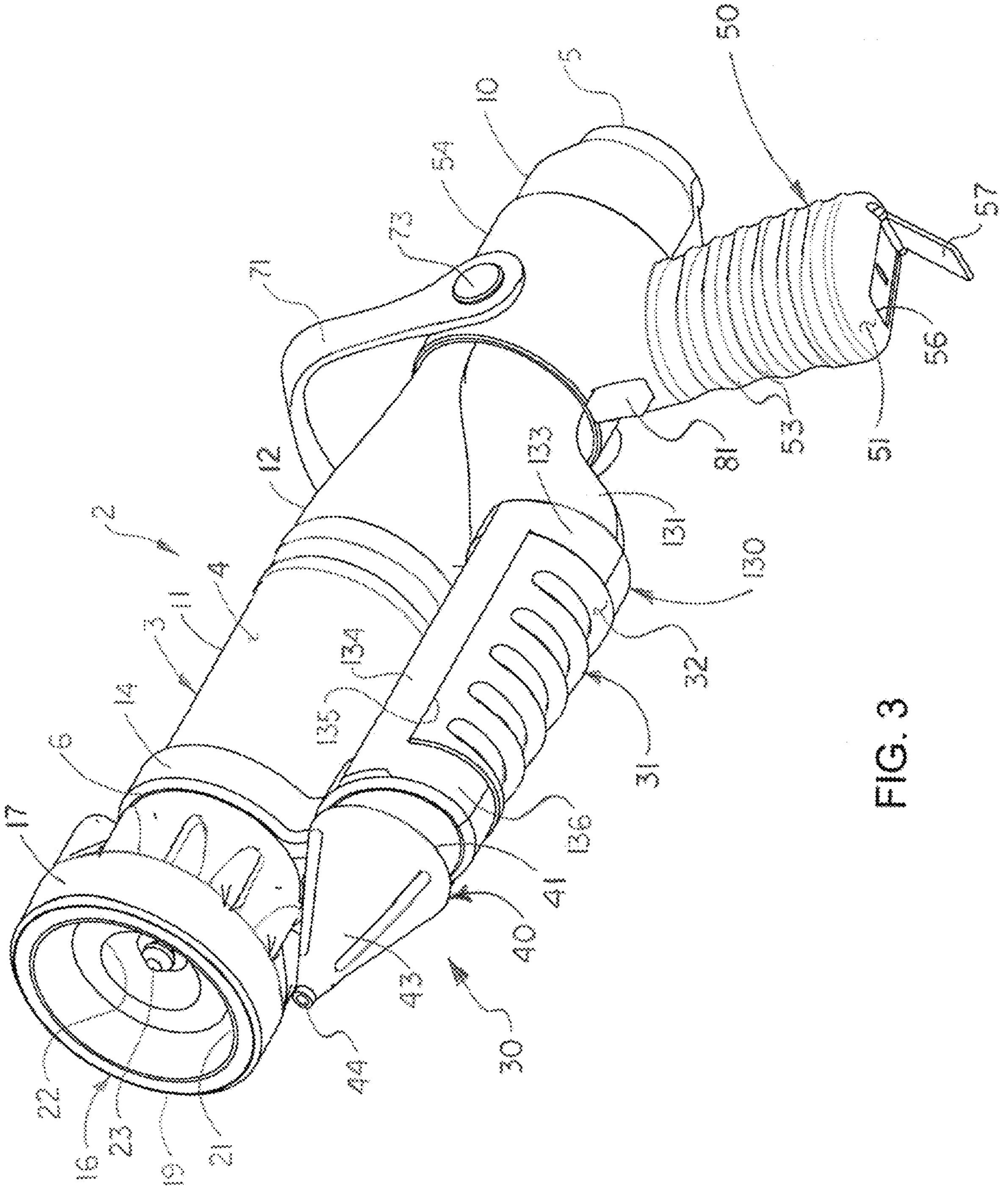
FIG. 3 is a bottom front perspective view of a typical spray nozzle of the illustrative system.
Figure 4:
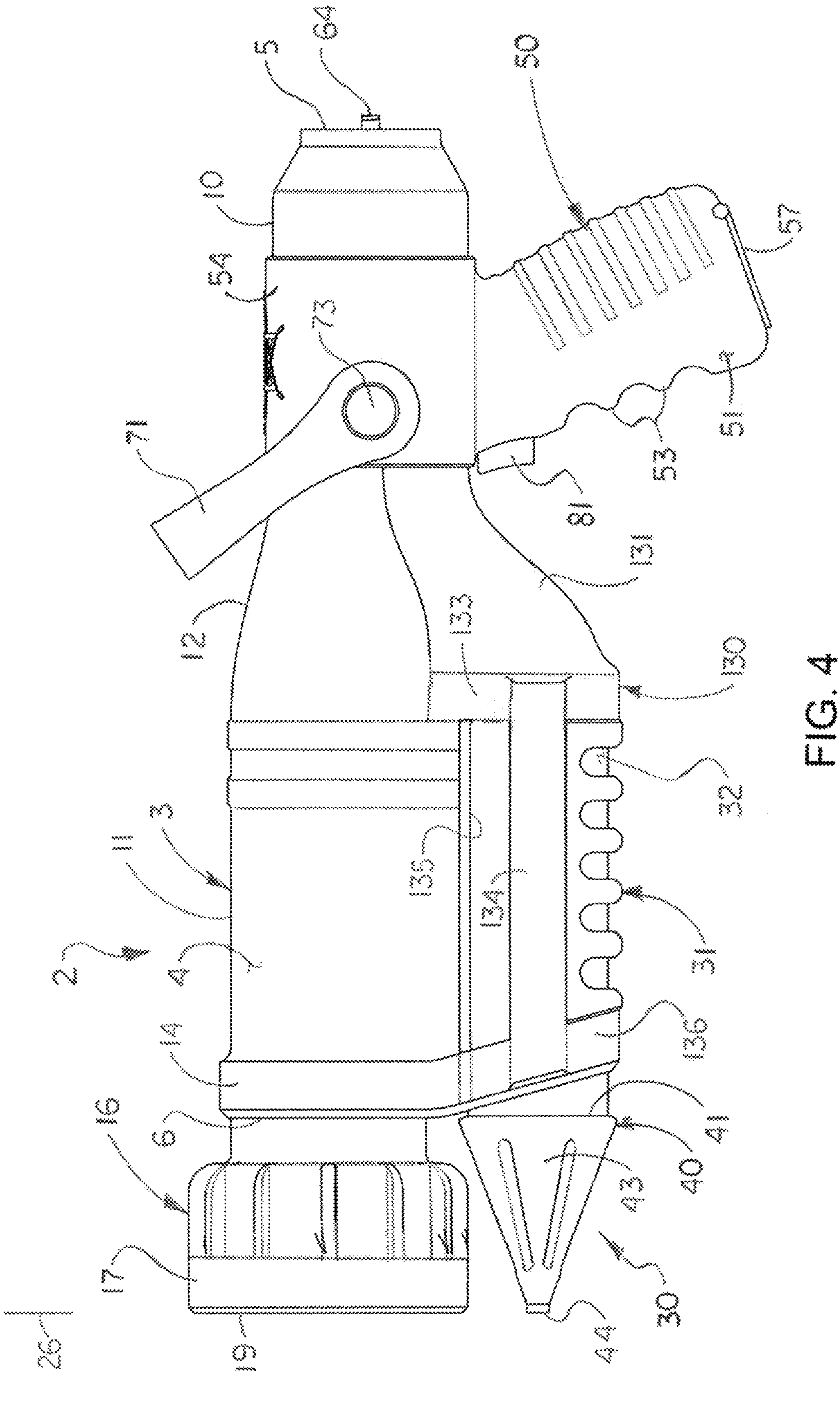
FIG. 4 is a left side view of the spray nozzle.
Figure 5:
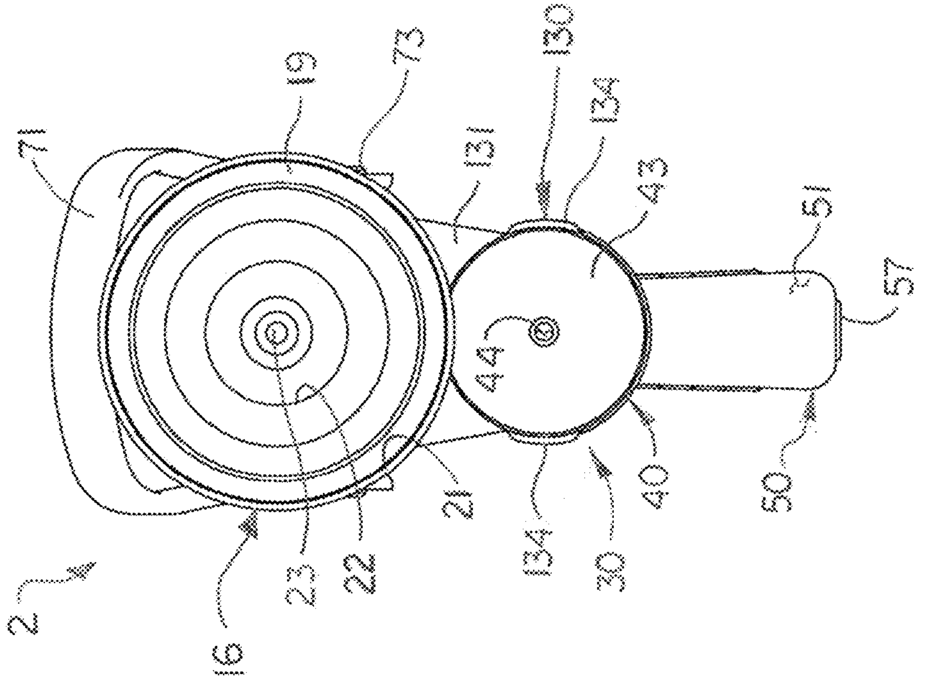
FIG. 5 is a front view of the spray nozzle.

In some embodiments, an applicator holder 130 may be supported by the applicator inlet portion 131 of the spray nozzle housing 3. The applicator holder 130 may have any structure or design which is suitable for the purpose of supporting the barrier-piercing applicator 30 on the spray nozzle housing 3. For example and without limitation, as illustrated in FIG. 4, in some embodiments, the applicator holder 130 may include a rear holder ring 133 on the applicator inlet portion 131 of the spray nozzle housing 3. A front holder ring 136 may be disposed in spaced-apart relationship to the rear holder ring 136 on the spray nozzle housing 3. In some embodiments, the front holder ring 136 may be aligned with, continuous with, contiguous with or fabricated in one piece with the wall flare 14 in the spray nozzle housing wall 4 of the spray nozzle housing 3. As illustrated in FIGS. 10 and 11, a side holder wall 134 may extend from the rear holder ring 133 to the front holder ring 136. A rear holder wall 132 may extend from the side holder wall 134 at the rear holder ring 133. A rear wall opening 137, the purpose of which will be hereinafter described, may extend through the rear holder wall 132. As illustrated in FIGS. 3 and 4, the side holder wall 134 may have at least one holder opening 135. The holder opening 135 may extend from the rear holder ring 133 to the front holder ring 136. Accordingly, the applicator housing 31 of the barrier-piercing applicator 30 may be disposed in or selectively disposable in and removable from the applicator holder 130 with the applicator housing 31 typically spanning the space between the rear holder ring 133 and the front holder ring 136 and visible through the holder spaces 135. The applicator tip 40 may protrude forwardly from the applicator housing 31 beyond the front holder ring 136 and beneath the spray tip 16 of the simulated spray nozzle 2, as illustrated.

Figure 6:
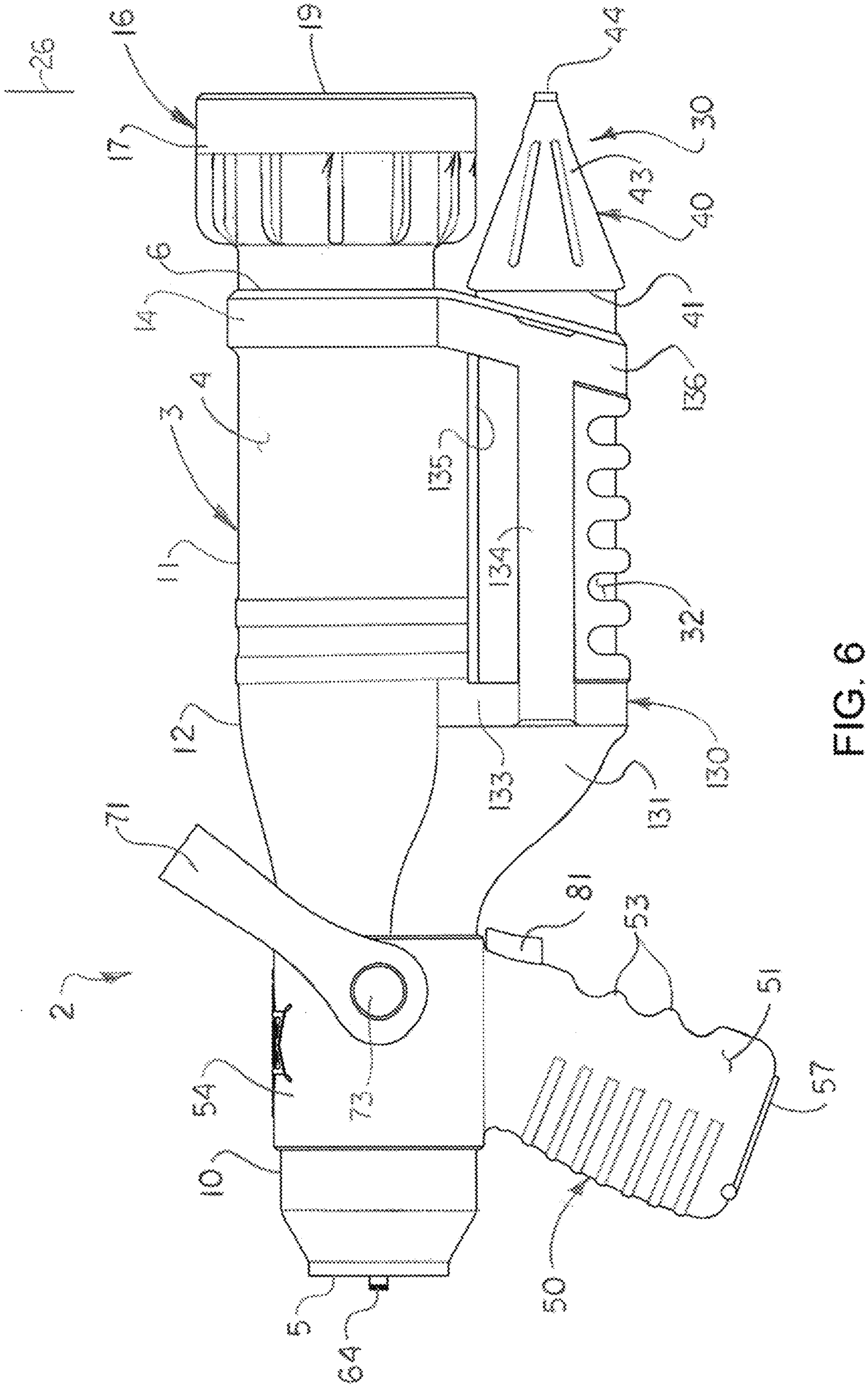
FIG. 6 is a right side view of the spray nozzle.
Figure 7:
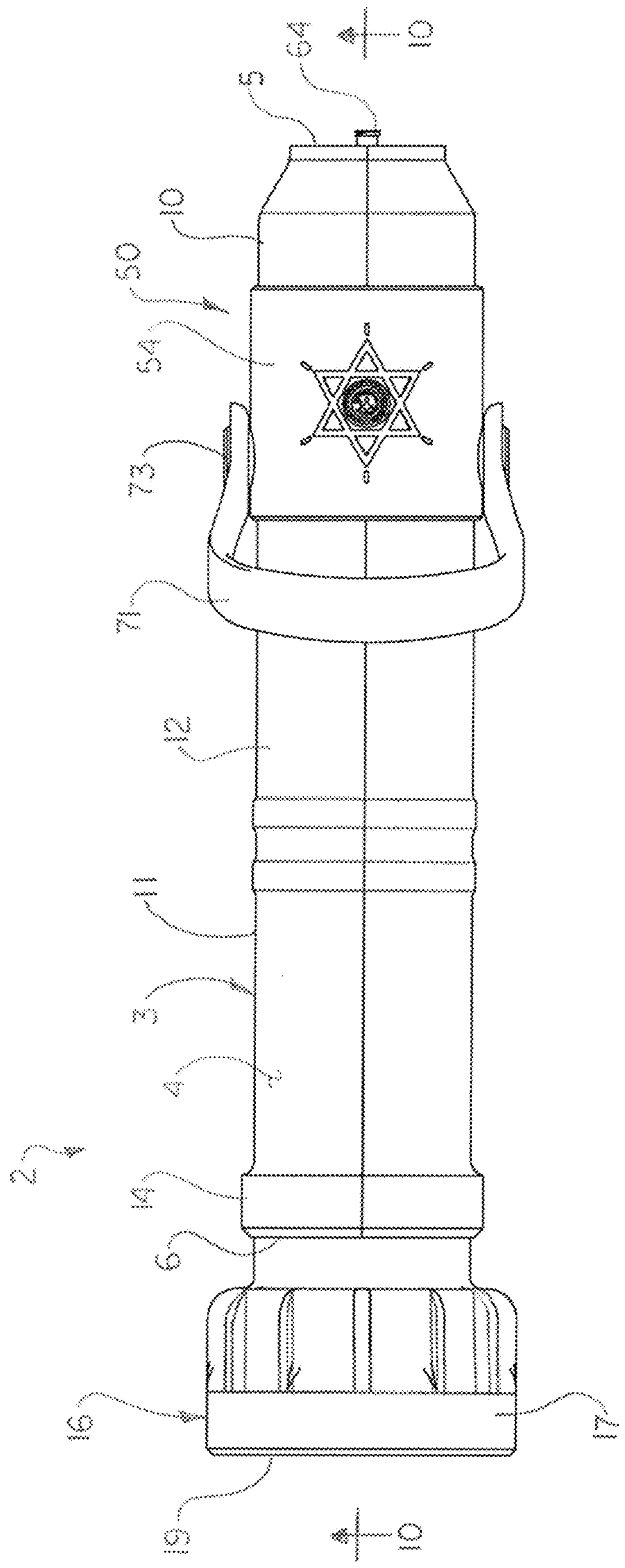
FIG. 7 is a top view of the spray nozzle.
Figure 8:
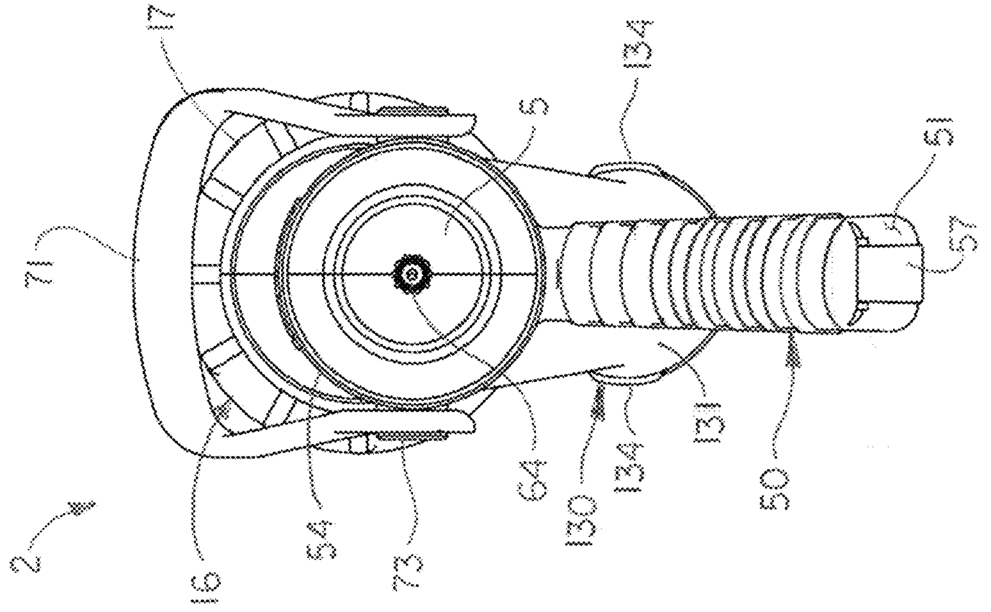
FIG. 8 is a rear view of the spray nozzle.
Figure 9:
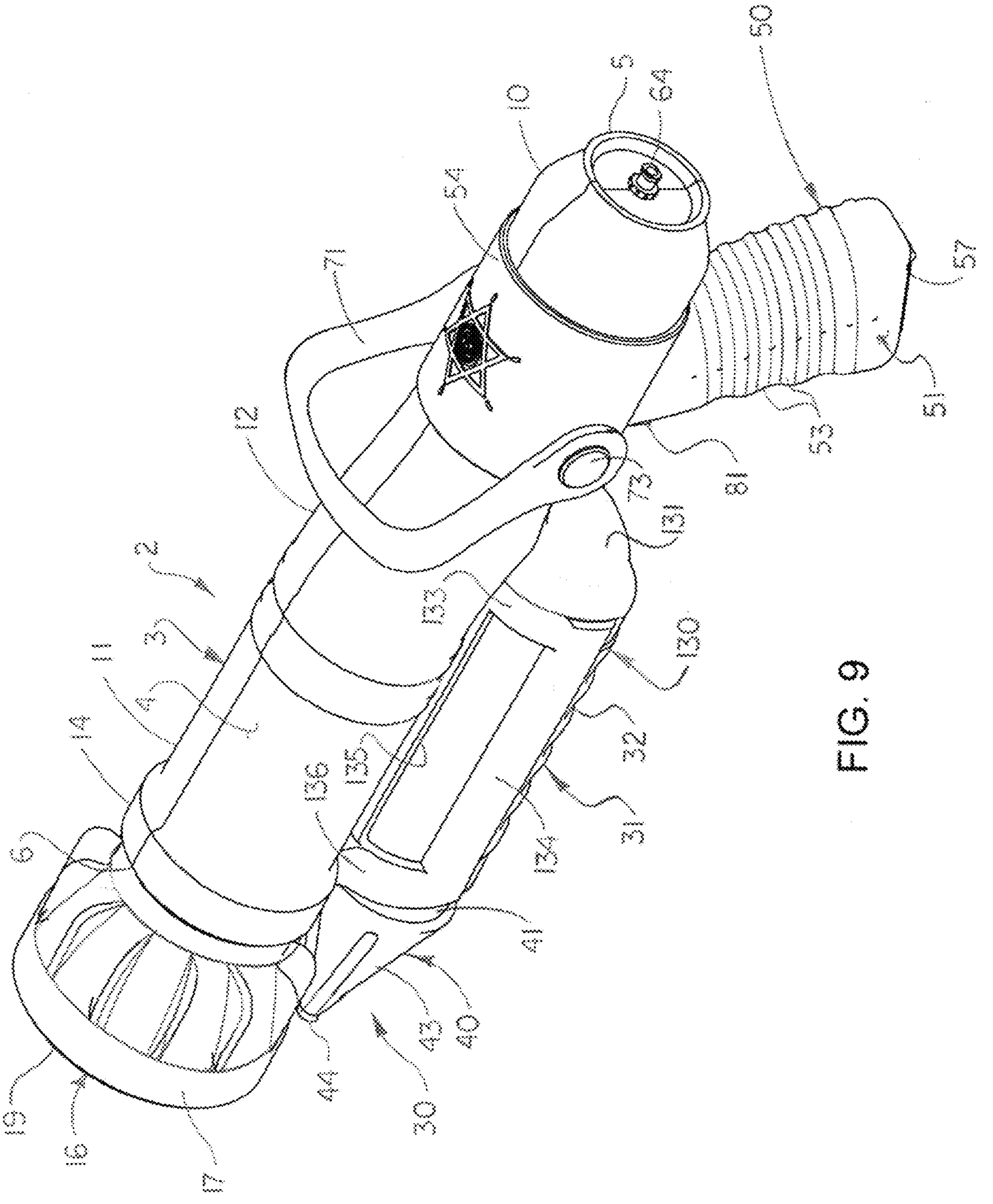
FIG. 9 is a rear perspective view of the spray nozzle.

In some embodiments, the simulated barrier-piercing applicator 30 may have a fixed length and the applicator tip 40 may be non-extendable with respect to the applicator housing 31. As illustrated in FIGS. 4 and 6, the applicator tip terminal end 44 of the applicator tip 40 may be disposed within the same plane 26 as the spray tip end 19 of the spray tip 16. In other embodiments, the applicator tip terminal end 44 may extend beyond or may be recessed with respect to the plane 26 of the spray tip end 19 of the spray tip 16.

A spray nozzle grip 50 may extend from the spray nozzle housing 3 of the spray nozzle 2. The spray nozzle grip 50 may have a grip wall 51 which forms a grip interior 52, as illustrated in FIGS. 10 and 11. The grip wall 51 may extend downwardly from the spray nozzle housing wall 4 at the base housing section 10 of the spray nozzle housing 3, behind the applicator inlet portion 131. Finger ridges 53 may be formed, shaped and/or otherwise provided in the front portion of the grip housing wall 52. In some embodiments, a grip opening 56 which communicates with the grip interior 52 may extend through the grip wall 51, typically in the bottom or lower portion of the spray nozzle grip 50. A grip opening door 57 may be configured to facilitate selective opening and closing of the grip opening 56 typically according to the knowledge of those skilled in the art. The grip opening door 57 may be pivotally, slidably, detachably or otherwise mounted with respect to the grip wall 51 in a manner which is suitable for the purpose.

The grip housing 51 of the spray nozzle grip 50 may be attached to the spray nozzle housing wall 4 of the base housing section 10 using any suitable technique known by those skilled in the art. In some embodiments, the spray nozzle grip 50 and the spray nozzle housing 3 may be fabricated separately and then assembled. For example and without limitation, in some embodiments, the grip housing wall 52 may extend from a grip mount sleeve 54. The grip mount sleeve 54 may receive and at least partially encircle the base housing section 10 of the spray nozzle housing 3 and may be attached thereto using glue, adhesive, mechanical fasteners, or combinations thereof. In some embodiments, the spray nozzle grip 50 may be casted, molded or otherwise fabricated in one piece with the spray nozzle housing 3 typically according to the knowledge of those skilled in the art. For example and without limitation, the grip wall 51 may be casted, molded or otherwise formed in one piece with the spray nozzle housing wall 4 of the spray nozzle housing 3, with or without the grip mount sleeve 54.

As illustrated in FIGS. 10 and 11, a spray control assembly 60 may include a water inlet conduit 61 in the base housing section 10 of the pray nozzle housing 3. The water inlet conduit 61 may have an inlet end 62 and an outlet end 63. The inlet end 62 of the water inlet conduit 61 may extend through a conduit opening (not numbered) in the rear housing wall 8 of the spray nozzle housing 3. A hose nipple 64, the purpose of which will be hereinafter described, may terminate the inlet end 62 exterior to the rear housing wall 8.

A selector valve 66 may include a selector valve housing 67 in the housing interior 7 of the base housing section 10. The selector valve housing 67 may have a selector valve housing interior 68. A selector valve inlet 78 may extend from the selector valve housing 67 in fluid communication with the selector valve housing interior 68 and in fluid communication with the outlet end 63 of the water inlet conduit 61. A spray tip outlet 69 and an applicator outlet 74, the purpose of which will be hereinafter described, may extend from the selector valve housing 67 in fluid communication with the selector valve housing interior 68.

A selector valve body 70 may be disposed in the selector valve housing interior 68 of the selector valve housing 67. As illustrated in FIG. 10, the selector valve body 70 may be selectively deployable in a spray nozzle mode to dispose the selector valve housing interior 68 of the selector valve housing 67 in fluid communication with the spray tip 16 of the simulated spray nozzle 2. As illustrated in FIG. 11, the selector valve body 70 may alternatively be selectively deployable in an applicator mode to dispose the selector valve housing interior 68 of the selector valve housing 67 in fluid communication with the applicator tip 40 of the simulated barrier-piercing applicator 30.

The selector valve body 70 of the selector valve 66 may be selectively deployable in the spray nozzle mode and the applicator mode using any suitable technique known by those skilled in the art. Accordingly, in some embodiments, a selector handle 71 may operably engage the selector valve body 70. The selector handle 71 may span or straddle the width of the base housing section 10 above and exterior to the spray nozzle housing 3. The selector handle 71 may be operable to selectively deploy the selector valve body 70 in the spray nozzle mode and the applicator mode. A handle shaft 73 may be operably engaged for rotation by the selector handle 71. The handle shaft 73 may extend through registering shaft openings (not illustrated) in the spray nozzle housing wall 4 at the base housing section 10 of the spray nozzle housing 3. The handle shaft 73 may operably engage the selector valve body 70 of the selector valve 66 to facilitate selective deployment of the selector valve body 70 in the spray nozzle mode and the applicator mode. For example and without limitation, as illustrated in FIG. 10, in some embodiments, forward movement of the selector handle 71 on the spray nozzle housing 3 may facilitate deployment of the selector valve body 70 in the spray nozzle mode, whereas rearward movement of the selector handle 71 on the spray nozzle housing 3 may facilitate deployment of the selector valve body 70 in the applicator mode, as illustrated in FIG. 11.

A spray tip connector conduit 72 in the housing interior 7 may be disposed in fluid communication with the spray tip outlet 69 of the selector valve 66. The spray tip conduit 22 in the spray tip interior 20 of the spray tip 16 may be disposed in fluid communication with the spray tip connector conduit 72. Accordingly, in the spray tip mode of the selector valve 66, the spray tip connector conduit 72 may be configured to distribute liquid from the selector valve 66 to the spray tip 16 for discharge or ejection of the liquid from the spray tip 16.

An applicator connector conduit 75 may be disposed in fluid communication with the applicator outlet 74 of the selector valve 66. The applicator tip conduit 48 in the applicator tip interior 45 of the applicator tip 40 may be disposed in fluid communication with the applicator connector conduit 75. Accordingly, in the applicator mode of the selector valve 66, the applicator connector conduit 75 may be configured to distribute liquid from the selector valve 66 to the applicator tip 40 for discharge or ejection of the liquid from the applicator tip 40.

A water pump 76 may be disposed in fluid communication with the selector valve housing interior 68 of the selector valve housing 67, typically through a water pump outlet conduit 77. The water pump 76 may be configured to pressurize the water inlet conduit 61 to facilitate flow of liquid from the water tank 86 and the tank hose 96, respectively, through the water inlet conduit 61 from the inlet end 62 to the outlet end 63 and then through the selector valve interior 68 and either the spray tip connector conduit 72 to the spray tip 16 (in the spray tip mode) or the applicator connector conduit 75 to the applicator tip 40 (in the applicator mode) of the selector valve 66.

Figure 16:
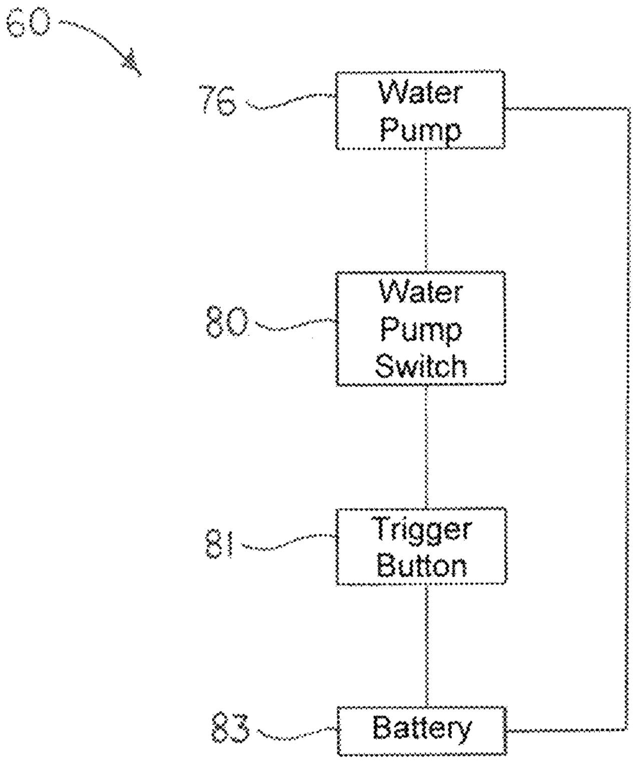
FIG. 16 is a functional block diagram illustrating typical operational components of the spray control system suitable for implementing control of the spray nozzle.

As illustrated in FIG. 16, in some embodiments, the spray control assembly 60 may include a water pump switch 80 which controllably interfaces with the water pump 76. A trigger button 81 may controllably interface with the water pump switch 80. The trigger button 81 may be selectively manipulable in a typically spring-loaded extended button position and a depressed button position. The trigger button 81 may be operable to open the water pump switch 80 in the extended button position and to close the water pump switch 80 in the depressed button position. At least one battery, hereinafter battery 83, may electrically interface with the water pump 76 and the trigger button 81. Accordingly, responsive to deployment of the trigger button 81 from the extended button position to the depressed button position, the water pump switch 80 may be configured to close and operate the water pump 76 to pump the liquid through the water inlet conduit 61 to the selector valve 66. Responsive to release of the trigger button 81 from the depressed button position to the extended button position, the water pump switch 80 may open to terminate further operation of the water pump 76.

As illustrated in FIGS. 10 and 11, in some embodiments, the water pump switch 80 and the battery 83 may be disposed in the grip interior 52 of the spray nozzle grip 50. The battery 83 may be selectively placeable into and removable from the grip interior 52 by opening the grip opening 56 via deployment of the grip opening door 57. The trigger button 81 may be disposed in a finger accessible location on the spray nozzle grip 50, such as at the upper front portion of the grip wall 51 beneath the base housing section 10 of the spray nozzle housing 3.

The battery 83 may include at least one disposable battery and/or at least one rechargeable battery. In the former case, the disposable battery 83 may be removable from the grip interior 52 for replacement. In the latter case, the rechargeable battery 83 may be removable from the grip interior 52 of the spray nozzle grip 50 for recharging and subsequent reinstallation. Alternatively, in some embodiments, a recharging port (not illustrated) may be disposed on the exterior of the grip wall 51. The recharging port may electrically interface with the positive and negative pole contacts (not illustrated) for the battery 83 in the grip interior 52. Accordingly, a source of electrical power (not illustrated), such as a laptop computer, notebook computer or other external device or an electrical outlet, for example and without limitation, may be connected to the recharging port via a suitable recharging cord or cable (not illustrated) for recharging of the battery 83. At least one recharging light (not illustrated) may electrically interface with the rechargeable battery 83 to indicate the charge status of the battery 83 typically according to the knowledge of those skilled in the art. The recharging light may be disposed on the exterior of the grip wall 51 or in any other visually accessible location.

The user harness 101 of the tank harness assembly 100 may have any design which is suitable for the purpose of supporting the water tank 86 on the user. For example and without limitation, as illustrated in FIGS. 12-15, in some embodiments, the user harness 101 may include a harness base 102. The harness base 102 may be suitably sized and configured to be fastened around the waist of the user. In some embodiments, the harness base 102 may include a front harness base segment 103. A pair of side harness base segments 104 may extend outwardly and rearwardly from the front harness base segment 103. A pair of rear harness base segments 105 may extend rearwardly from the respective side harness base segments 104.

A strap release device 106 may selectively and releasably secure the rear harness base segments 105 of the harness base 102 to each other. The strap release device 106 may have any design which is suitable for the purpose. For example and without limitation, in some embodiments, the strap release device 106 may include a quick disconnect connector having a strap release tab 107 on one of the rear harness base segments 105 and a strap buckle 108 on the other of the rear harness base segments 105. The strap buckle 108 may be configured to releasably engage the strap release tab 107. In some embodiments, the strap release device 106 may include hook and loop fasteners, snaps, buttons and/or other types of fastening mechanisms and/or devices which may be suitable for the purpose. A pair of shoulder strap attachment segments 110 may extend from the respective rear harness base segments 105, on opposite sides of the strap release device 106 and in typically parallel relationship to each other.

A main harness strap 114 may extend from the front harness base segment 103 of the harness base 102. A pair of shoulder straps 116 may extend from the main harness strap 114. Each shoulder strap 116 may be attached to its corresponding shoulder strap attachment segment 110 via a strap fastener 117. Accordingly, the shoulder straps 116 may be configured for deployment over the respective shoulders of the user in deployment of the user harness 101 on the user.

Figure 2:
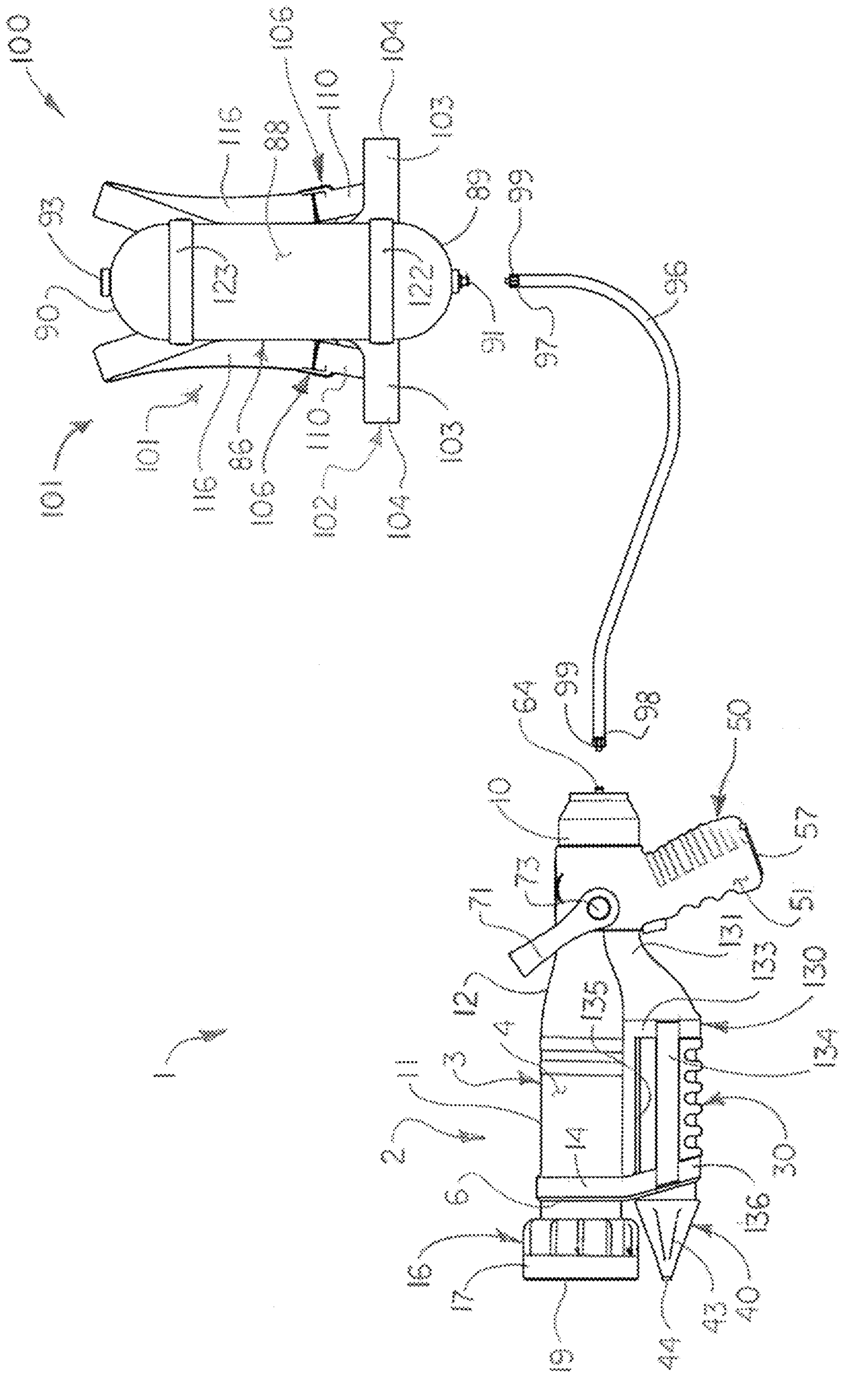
FIG. 2 is an exploded side view of the illustrative toy firehose nozzle water gun system, with the spray nozzle and the water tank of the tank harness assembly detached from the tank hose.
Figure 13:
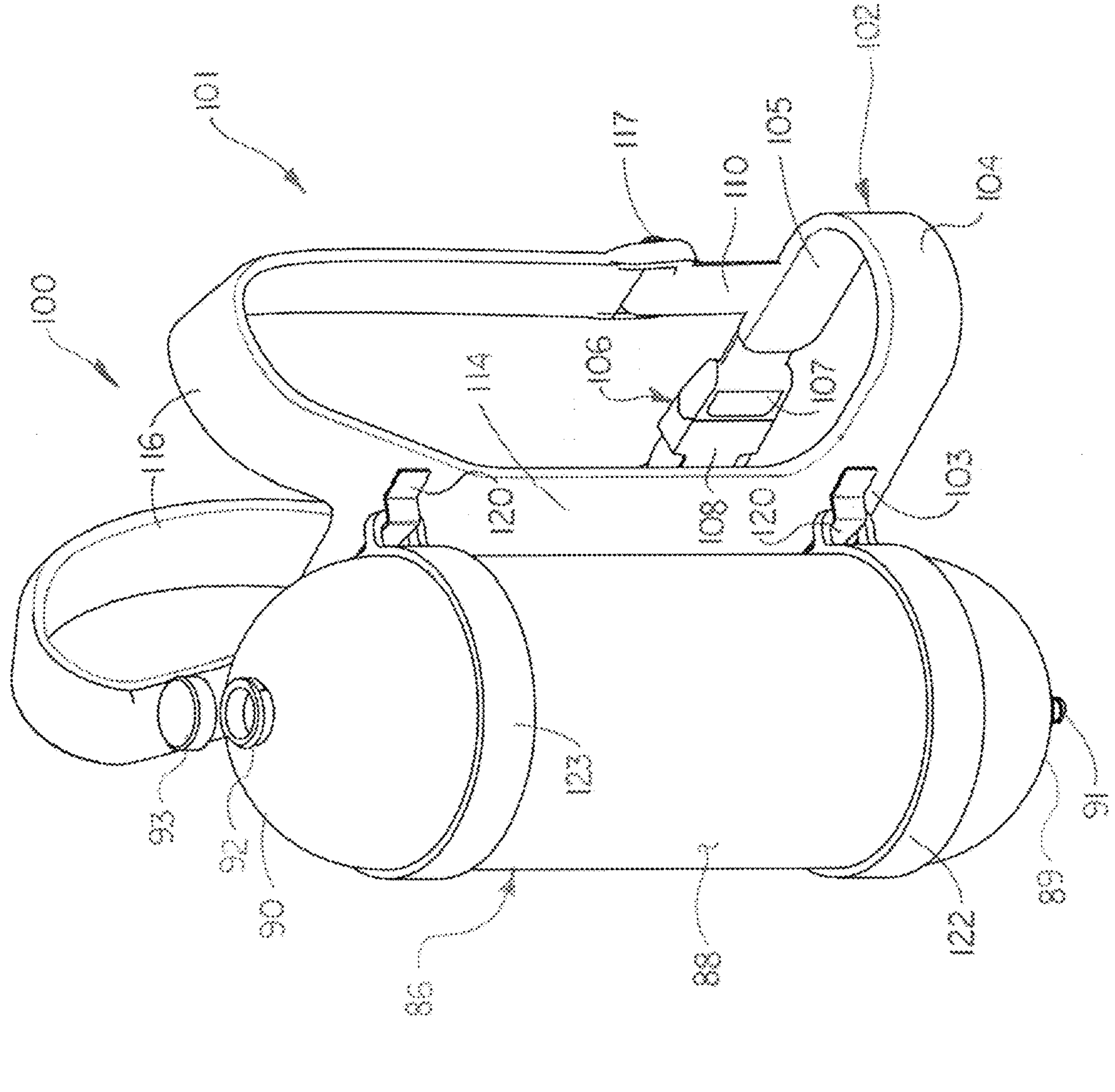
FIG. 13 is an exploded front perspective view of the tank harness assembly illustrated in FIG. 12, with the cap removed from the tank fill neck.
Figure 14:
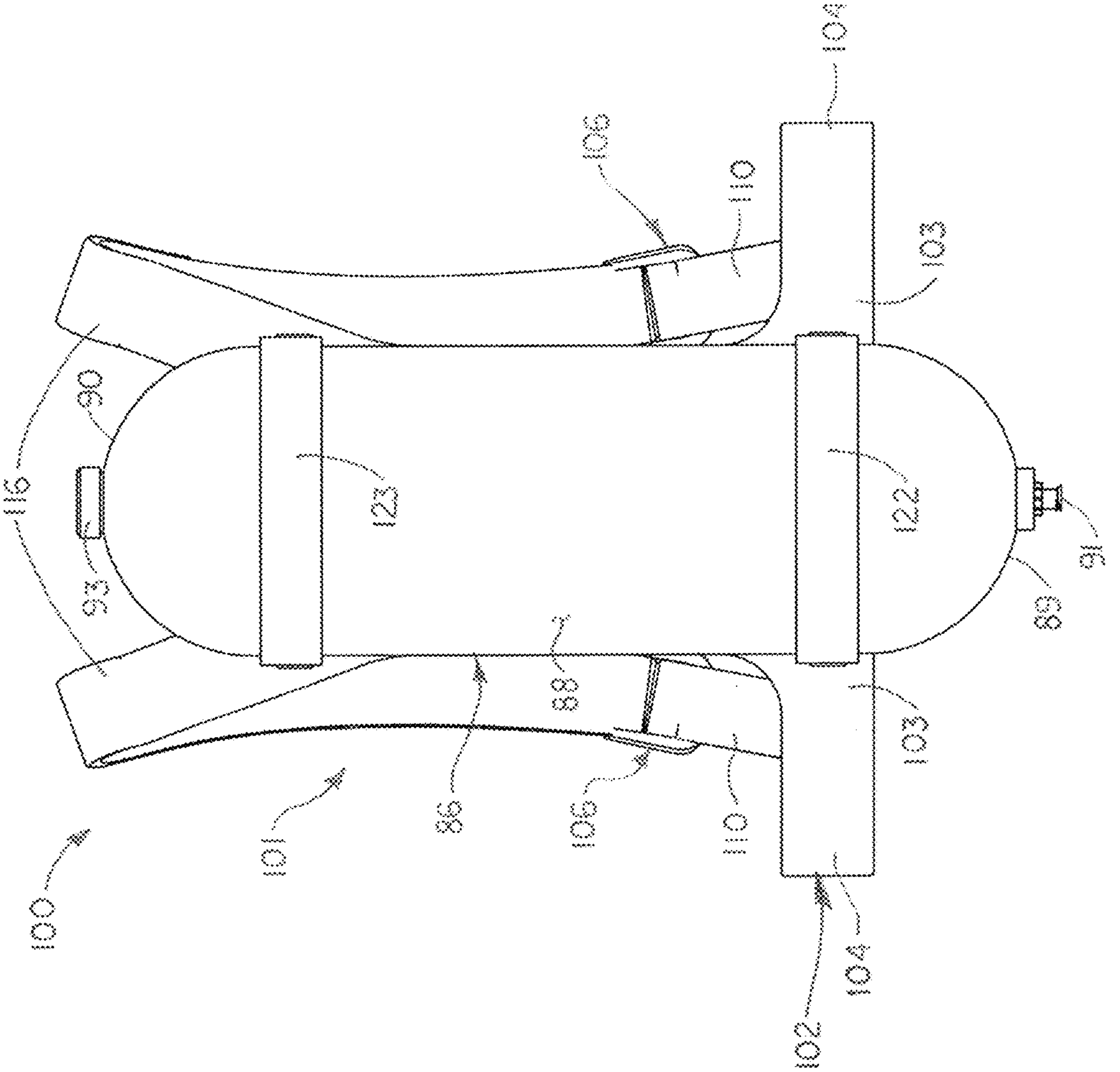
FIG. 14 is a front view of the tank harness assembly.
Figure 15:
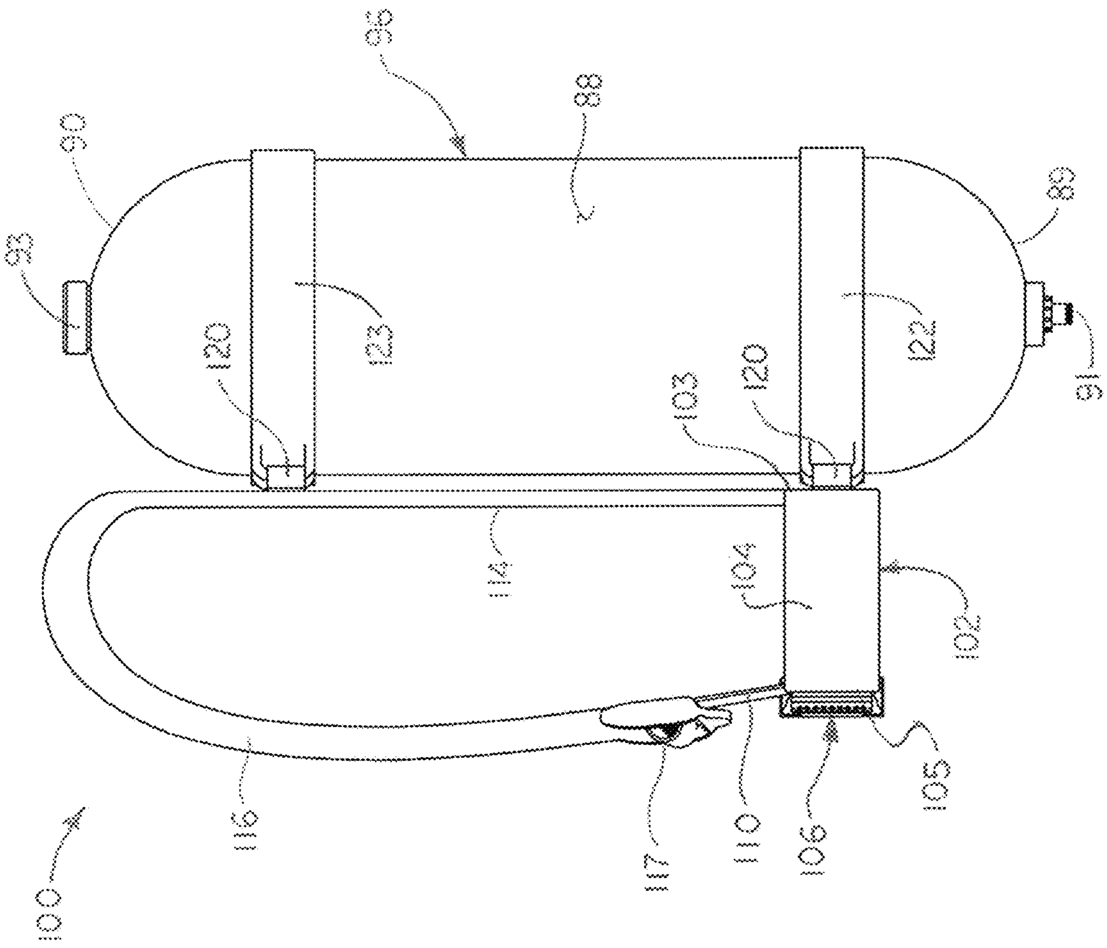
FIG. 15 is a right side view of the tank harness assembly.

The water tank 86 of the tank harness assembly 100 may be configured to contain a supply of water or other liquid (not illustrated) and may be disposable in fluid communication with the water pump 76 of the spray control assembly 60 typically through the tank hose 96 (FIGS. 1 and 2). The water tank 86 may have any size, shape and design suitable for the purpose of holding and dispensing the liquid for discharge or ejection from the simulated spray nozzle 2 or the simulated barrier-piercing applicator 30. In some embodiments, the water tank 86 may have an elongated, cylindrical tank wall 88. A typically domed lower tank end 89 and a typically domed upper tank end 90 may close the respective lower and upper ends of the tank wall 88. A selectively openable and closable tank drain 91 may be in the lower tank end 89. As illustrated in FIG. 13, a tank fill neck 92, typically fitted with a removable cap 93, may protrude from the upper tank end 90. Accordingly, the liquid may be placed in the water tank 86 through the uncapped tank fill neck 92. Liquid may be drained or distributed from the water tank 86 by operation of the water pump 76.

Figure 12:
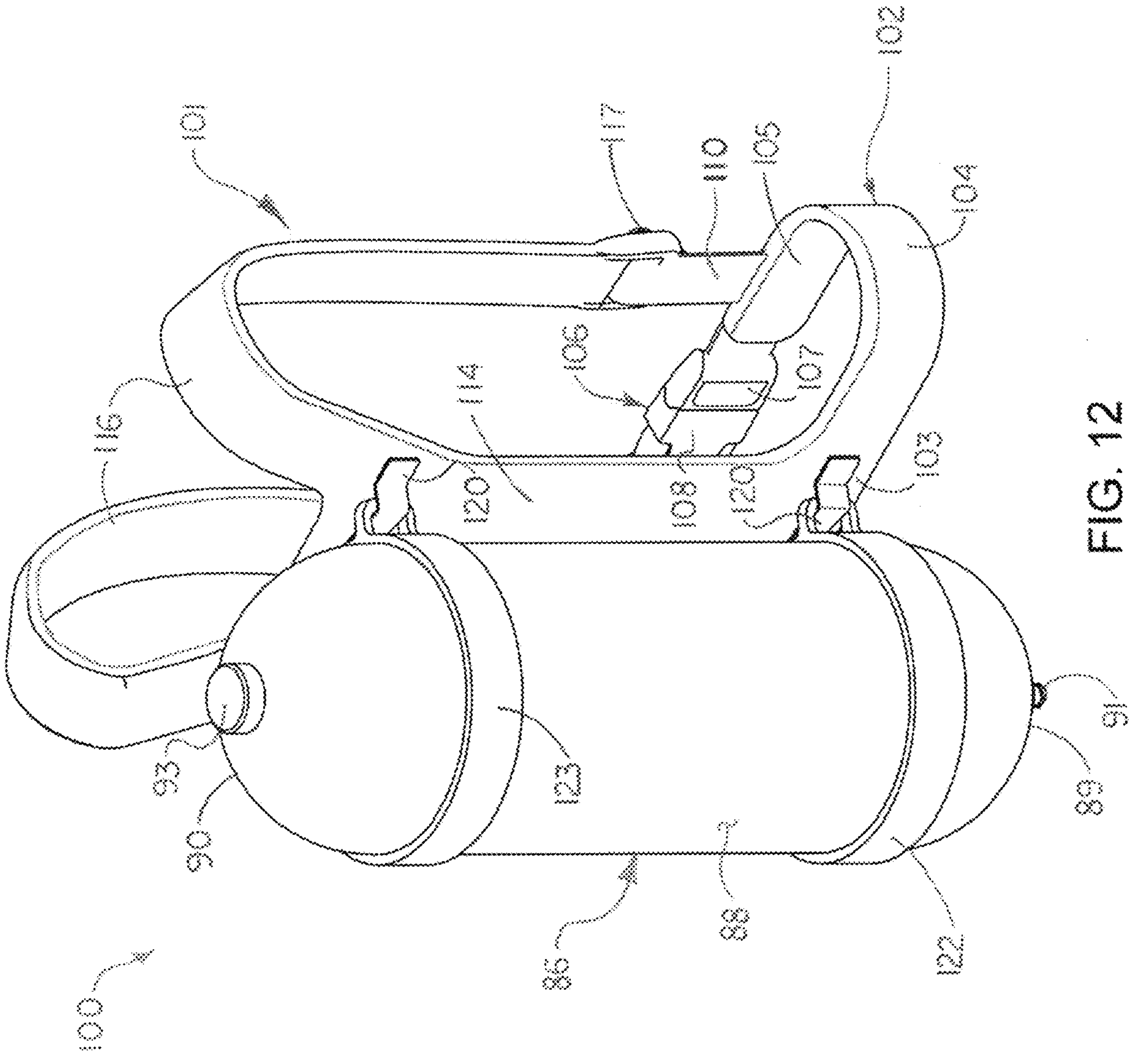
FIG. 12 is a front perspective view of a typical tank harness assembly of the illustrative system, with the cap deployed in place on the tank fill neck on the water tank of the assembly.

The water tank 86 may be supported by the main harness strap 114 of the user harness 101 and may be attached thereto using any technique suitable for the purpose. For example and without limitation, as illustrated in FIGS. 12 and 13, in some embodiments, at least one tank holder ring 122, 123 may be supported by on the main harness strap 114 via a tank support bracket 120 or other support structure or device. Each of the lower tank holder ring 122 and the upper tank holder ring 123 may be suitably sized and configured to receive the water tank 86.

As illustrated in FIG. 2, the tank hose 96 may have a tank end 97 and a nozzle end 98. A hose coupling 99 may be on the tank end 97 and on the nozzle end 98. The hose coupling 99 on the nozzle end 98 of the tank hose 96 may be configured for coupling with the exterior hose nipple 64 on the water inlet conduit 61 (FIG. 10) in the spray nozzle housing 3 of the spray nozzle 2. The hose coupling 99 on the tank end 97 of the tank hose 96 may be configured for coupling with the tank drain 91 on the water tank 86. Accordingly, the water pump 76 may be configured to selectively pump the liquid from the water tank 86 through the tank hose 96 to the spray tip 16 of the simulated spray nozzle 2 or to the applicator tip 40 of the simulated barrier-piercing applicator 30.

Any or all of the components of the simulated spray nozzle 2, the applicator holder 130, the simulated barrier-piercing applicator 30, the spray nozzle grip 50 and the spray control assembly 60, as well as the water tank 86 of the tank harness assembly 100, may be fabricated of a lightweight, mediumweight or heavyweight plastic material; a metal or metals such as aluminum, steel and/or brass; composite material or materials; or combinations thereof using casting, molding, extrusion, 3D printing, machining, or combinations thereof. Non-limiting examples of suitable materials may include polypropylenes such as High density polypropylene (HDPP); High density polyethylene (HDPE) as well as other plastics which form the PE (polyethylene) group of plastics and include but are not limited to LDPE (Low-Density Polyethylene), LLDPE (Linear Low-Density Polyethylene), and UHMWPE (Ultra-High Molecular Weight Polyethylene); Polyethylene Terephthalate (PET or PETE); Polyvinyl Chloride (PVC or Vinyl); or combinations thereof. The tank hose 96 may include rubber, plastic and/or segmented metal or plastic. The harness base 102, the main harness strap 114 and the shoulder straps 116 of the user harness 101 may be fabricated of fabric, plastic, metal, composite materials or combinations thereof. In some embodiments, the harness base 102 may include a stiff or semi-stiff material which maintains the shape of the side harness base segments 104. In some embodiments, the water tank 86 may be fabricated in whole or in part of polystyrene (PS) or closed-cell extruded polystyrene (STYROFOAM™).

In typical application of the system 1, the water tank 86 of the tank harness assembly 100 may be connected to the simulated spray nozzle 2. Accordingly, as illustrated in FIG. 2, this may be accomplished by coupling the hose coupling 99 on the tank end 97 of the tank hose 96 to the companion tank drain 91 on the lower tank end 89 of the water tank 86 and by coupling the hose coupling 99 on the nozzle end 98 of the tank hose 96 to the companion hose nipple 64 on the simulated spray nozzle 2. As illustrated in FIG. 13, the cap 93 may be removed from the tank fill neck 92 on the upper tank end 90 of the water tank 86, the supply of water or other liquid (not illustrated) poured into the water tank 86 through the uncapped tank fill neck 92, and the cap 93 replaced thereon. The user harness 101 may be deployed in place on the user by positioning the shoulder straps 116 over the respective shoulders and fastening the strap release device 106 to secure the harness base 102 around the user's waist.

The user may hold and carry the simulated spray nozzle 2 by grasping the spray nozzle grip 50 with one hand and may operate the selector handle 71 with the other hand. Accordingly, the user may deploy the trigger button 81 from the extended button position to the depressed button position typically using the index finger on the gripping hand. The trigger button 81 may responsively deploy the water pump switch 80 from the open switch position to the closed switch position to facilitate flow of electrical current from the battery 83 to the water pump 76. The water pump 76 may pump the liquid from the water tank 86 through the tank hose 96 and then through the water inlet conduit 61, the selector valve 66 and to either the spray tip 16 or the applicator tip 40 typically depending on the position of the selector handle 71 as was heretofore described.

As illustrated in FIG. 10, the system 1 may be selectively operated in the spray nozzle mode to simulate use of the simulated spray nozzle 2 in fighting a fire as the user role plays as a firefighter. Accordingly, in the forward position of the selector handle 71, the selector valve body 70 may be oriented such that the spray tip connector conduit 72 is disposed in fluid communication with the water inlet conduit 61 through the selector valve housing interior 68 of the selector valve housing 67. The pumped liquid may thus flow under pressure from the water inlet conduit 61 through the selector valve housing interior 68 and the spray tip connector conduit 72, respectively, and then through the spray tip conduit 22 in the spray tip 16. The force of the forwardly flowing liquid may deploy the spray tip valve 23 forwardly against the spring bias such that the spray tip valve 23 deploys from the sealing valve position to the unsealing valve position and unseats or disengages from the spray tip conduit 22 at the valve cavity 24 to enable flow of the liquid through the valve cavity 24 and discharge or ejection of the liquid in a stream from the spray tip 16 through the spray tip cavity 21. The user may aim or guide the direction or orientation of the simulated spray nozzle 2 such that the spray tip 16 is directed toward a target such as another user in a water fight exercise or at an object or a fire which is to be put out in a simulated firefighting exercise.

As illustrated in FIG. 11, the system 1 may be selectively operated in the applicator mode such as to simulate use of the simulated barrier-piercing applicator 30 in piercing a wall or other structure or barrier (not illustrated) in fighting a fire on the other side of the barrier. Accordingly, in the rearward position of the selector handle 71, the selector valve body 70 may be oriented such that the applicator connector conduit 75 is disposed in fluid communication with the water inlet conduit 61 through the selector valve housing interior 68 of the selector valve housing 67. The pumped liquid may thus flow under pressure from the water inlet conduit 61 through the selector valve housing interior 68 and the applicator connector conduit 75, respectively, and then in a stream through the applicator tip conduit 48 in the applicator tip 40. The liquid may be discharged from the applicator tip conduit 48 through the applicator tip terminal end 44 of the application tip 40 and toward or against the target.

Operation of the water pump 76 may be terminated by release of the trigger button 81 such that the trigger button 81 deploys from the depressed button position to the extended button position. Replacement liquid may be placed in the water tank 86, as needed, typically by pouring the liquid through the uncapped tank fill neck 92 as was heretofore described with respect to FIG. 13. The battery 83 (FIGS. 10 and 11) may be replaced, as deemed necessary, typically by opening the grip opening door 57 to expose the grip opening 56 in the grip wall 51 of the spray nozzle grip 50; removing the depleted battery 83 from the grip interior 52; placing a fresh battery 83 into the grip interior 52 through the grip opening 56; and closing the grip opening door 57. Alternatively, the battery 83 may be recharged as the battery 83 remains in the spray nozzle grip 50 or by removing the battery 83 therefrom.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A toy firehose nozzle water gun system configured for operation by a user as a simulated firehose nozzle, the system comprising:

a simulated spray nozzle comprising:

a spray nozzle housing comprising:

a base housing section, a terminal housing section, a middle housing section flaring outwardly from the base housing section to the terminal housing section and an applicator inlet portion extending from the base housing section;

a housing interior formed by the base housing section, the terminal housing section, the middle housing section and the applicator inlet portion; and a spray tip on the terminal housing section;

a simulated barrier-piercing applicator comprising:

an applicator housing supported by the applicator inlet portion of the spray nozzle housing; and an applicator tip on the applicator housing;

a spray control assembly comprising:

a selector valve disposable in fluid communication with a selected one of the spray tip of the simulated spray nozzle in a spray nozzle mode and the applicator tip of the simulated barrier-piercing applicator in an applicator mode; and a water pump disposed in fluid communication with the selector valve; and a tank harness assembly comprising:

a user harness configured to be worn by the user;

a water tank supported by the user harness, the water tank configured to contain a supply of liquid and disposable in fluid communication with the water pump of the spray control assembly; and wherein the water pump is configured to selectively pump the liquid from the water tank to the selector valve and the selector valve is configured to distribute the liquid to the selected one of the spray tip of the simulated spray nozzle and the applicator tip of the simulated barrier-piercing applicator responsive to operation of the water pump.

2. The system of claim 1 wherein each of the simulated spray nozzle and the simulated barrier-piercing applicator comprises plastic.

3. The system of claim 1 wherein the applicator tip is non-extendable with respect to the applicator housing of the simulated barrier-piercing applicator.

4. The system of claim 1 wherein the spray control assembly comprises a selector handle operably engaging the selector valve, the selector handle operable to selectively deploy the selector valve in the spray nozzle mode and the applicator mode.

5. The system of claim 1 wherein the control system comprises a trigger button operably interfacing with the water pump, the trigger button selectively operable to operate the water pump.

6. The system of claim 1 comprising a spray tip connector conduit disposed in fluid communication with the selector valve and the spray tip of the simulated spray nozzle and an applicator connector conduit disposed in fluid communication with the selector valve and the applicator tip of the simulated barrier-piercing applicator.

7. The system of claim 1 wherein the spray tip of the simulated spray nozzle comprises a spray tip wall extending from the terminal housing section of the spray nozzle housing, the spray tip wall having a rear spray tip wall end and a front spray tip wall end; and a spray tip cavity in the front spray tip wall end, the spray tip cavity disposed in fluid communication with the selector valve of the spray control assembly.

8. The system of claim 7 comprising a valve cavity disposed in fluid communication with the spray tip cavity and with the selector valve of the spray control assembly and a spray tip valve in the valve cavity.

9. The system of claim 1 wherein the user harness of the tank harness assembly comprises a harness base, a main harness strap extending from the harness base and a pair of shoulder straps extending from the main harness strap, the shoulder straps selectively releasably attachable to the harness base; and wherein the water tank is supported by the main harness strap.

10. The system of claim 9 wherein the harness base comprises a front harness base segment; a pair of side harness base segments extending outwardly and rearwardly from the front harness base segment; a pair of rear harness base segments extending from the side harness base segments, respectively; and a strap release device selectively and releasably securing the rear harness base segments to each other.

11. The system of claim 10 wherein the strap release device comprises a strap release tab on a first one of the rear harness base segments and a strap buckle on a second one of the rear harness base segments, the strap buckle configured to releasably engage the strap release tab.

12. The system of claim 9 comprising a pair of spaced-apart tank holder rings on the main harness strap, and wherein the water tank is supported by the tank holder rings.

13. A toy firehose nozzle water gun system configured for operation by a user as a simulated firehose nozzle, the system comprising:

a simulated spray nozzle comprising:

a spray nozzle housing comprising:

a base housing section, a terminal housing section, a middle housing section flaring outwardly from the base housing section to the terminal housing section, an applicator inlet portion extending from the base housing section and a spray nozzle grip extending from the base housing section;

a housing interior formed by the base housing section, the terminal housing section, the middle housing section and the applicator inlet portion; and a spray tip on the terminal housing section;

an applicator holder supported by the applicator inlet portion of the spray nozzle housing;

a simulated barrier-piercing applicator comprising:

an applicator housing supported by the applicator holder; and an applicator tip on the applicator housing;

a spray control assembly comprising:

a selector valve comprising:

a selector valve housing in the housing interior of the base housing section;

a selector valve body in the selector valve housing, the selector valve body selectively deployable in a spray nozzle mode to dispose the selector valve housing in fluid communication with the spray tip of the simulated spray nozzle and in an applicator mode to dispose the selector valve housing in fluid communication with the applicator tip of the simulated barrier-piercing applicator;

a selector handle operably engaging the selector valve body, the selector handle operable to selectively deploy the selector valve in the spray nozzle mode and the applicator mode; and a water pump disposed in fluid communication with the selector valve;

a tank harness assembly comprising:

a user harness configured to be worn by the user;

a water tank supported by the user harness, the water tank configured to contain a supply of liquid and disposable in fluid communication with the water pump of the spray control assembly; and wherein the water pump is configured to selectively pump the liquid from the water tank to the selector valve and the selector valve is configured to distribute the liquid to the selected one of the spray tip of the simulated spray nozzle and the applicator tip of the simulated barrier-piercing applicator responsive to operation of the water pump; and a flexible tank hose having a tank end disposed in fluid communication with the water tank of the tank harness assembly and a nozzle end disposed in fluid communication with the selector valve housing of the selector valve of the spray control assembly.

14. The system of claim 13 wherein each of the simulated spray nozzle and the simulated barrier-piercing applicator comprises plastic.

15. The system of claim 13 wherein the applicator tip is non-extendable with respect to the applicator housing of the simulated barrier-piercing applicator.

16. The system of claim 13 wherein the control system comprises a trigger button operably interfacing with the water pump, the trigger button selectively operable to operate the water pump.

17. The system of claim 13 comprising a spray tip connector conduit disposed in fluid communication with the selector valve housing of the selector valve and the spray tip of the simulated spray nozzle and an applicator connector conduit disposed in fluid communication with the selector valve housing of the selector housing and the applicator tip of the simulated barrier-piercing applicator.

18. The system of claim 13 wherein the spray tip of the simulated spray nozzle comprises a spray tip wall extending from the terminal housing section of the spray nozzle housing, the spray tip wall having a rear spray tip wall end and a front spray tip wall end; and a spray tip cavity in the front spray tip wall end, the spray tip cavity disposed in fluid communication with the selector valve housing of the selector valve of the spray control assembly.

19. The system of claim 18 comprising a valve cavity disposed in fluid communication with the spray tip cavity and with the selector valve housing of the selector valve of the spray control assembly and a spray tip valve in the valve cavity.

20. A toy firehose nozzle water gun system configured for operation by a user as a simulated firehose nozzle, the system comprising:

a simulated spray nozzle comprising:

a spray nozzle housing comprising:

a base housing section, a terminal housing section, a middle housing section flaring outwardly from the base housing section to the terminal housing section, an applicator inlet portion extending from the base housing section and a spray nozzle grip extending from the base housing section;

a housing interior formed by the base housing section, the terminal housing section, the middle housing section and the applicator inlet portion; and a spray tip on the terminal housing section;

an applicator holder supported by the applicator inlet portion of the spray nozzle housing, the applicator holder comprising:

a rear holder ring on the applicator inlet portion;

a front holder ring spaced-apart with respect to the rear holder ring; and at least one side holder wall extending between the rear holder ring and the front holder ring;

a simulated barrier-piercing applicator comprising:

an applicator housing supported by the applicator holder; and an applicator tip on the applicator housing;

a spray control assembly comprising:

a selector valve disposable in fluid communication with a selected one of the spray tip of the simulated spray nozzle in a spray nozzle mode and the applicator tip of the simulated barrier-piercing applicator in an applicator mode; and a water pump disposed in fluid communication with the selector valve; and a tank harness assembly comprising:

a user harness configured to be worn by the user;

a water tank supported by the user harness, the water tank configured to contain a supply of water and disposable in fluid communication with the water pump of the spray control assembly; and wherein the water pump is configured to selectively pump the water from the water tank to the selector valve and the selector valve is configured to distribute the water to the selected one of the spray tip of the simulated spray nozzle and the applicator tip of the simulated barrier-piercing applicator responsive to operation of the water pump.

* * * * *